(12) United States Patent
Kadloor et al.

(10) Patent No.: US 10,459,741 B2
(45) Date of Patent: Oct. 29, 2019

(54) AUTOMATIC LOAD BALANCING FOR RESOURCE ALLOCATIONS

(71) Applicant: Facebook, Inc., Menlo Park, CA (US)

(72) Inventors: Sachin Kadloor, Palo Alto, CA (US); Lakshmi Ganesh, Mountain View, CA (US); Jiacheng Feng, Fremont, CA (US); Sajal Jain, Mountain View, CA (US); Qiang Wu, Foster City, CA (US)

(73) Assignee: Facebook, Inc., Menlo Park, CA (US)

(*) Notice: Subject to any disclaimer, the term of this patent is extended or adjusted under 35 U.S.C. 154(b) by 158 days.

(21) Appl. No.: 15/482,415

(22) Filed: Apr. 7, 2017

(65) Prior Publication Data

US 2018/0293084 A1    Oct. 11, 2018

(51) Int. Cl.
*G06F 9/50* (2006.01)
*G06F 9/445* (2018.01)
*G06F 13/40* (2006.01)

(52) U.S. Cl.
CPC ........ *G06F 9/44505* (2013.01); *G06F 9/5061* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 7,857,214 B2* | 12/2010 | Saliaris | G06F 1/181 235/383 |
| 7,904,599 B1* | 3/2011 | Bennett | H04L 67/1097 709/232 |
| 8,140,652 B2* | 3/2012 | Calo | G06F 9/5094 709/221 |
| 9,591,606 B1* | 3/2017 | Shetty | H04W 64/00 |
| 9,600,791 B2* | 3/2017 | Talwar | G06Q 10/06316 |
| 2005/0027577 A1* | 2/2005 | Saeed | G06Q 10/06 705/7.12 |
| 2009/0083390 A1* | 3/2009 | Abu-Ghazaleh | G06F 15/16 709/209 |
| 2009/0083484 A1* | 3/2009 | Basham | G06F 3/0605 711/114 |
| 2017/0279672 A1* | 9/2017 | Krishnan | H04L 41/0803 |

* cited by examiner

*Primary Examiner* — Elias Mamo
(74) *Attorney, Agent, or Firm* — FisherBroyles, LLP

(57) ABSTRACT

A computing system operates according to a method including: processing representations of housing structures with open locations for physically locating computing resources, a physical layout of the open locations, and characteristics of the structures and the resources to generate designated locations for optimally placing or allocating the computing resources in the open locations. The designated locations are generated based on analyzing multiple possible allocation or placement combinations of the computing resources into the open locations as an optimization function.

20 Claims, 5 Drawing Sheets

AUTOMATIC LOAD BALANCING FOR RESOURCE ALLOCATIONS

BACKGROUND

Computing systems are accessed by users to communicate with each other, share their interests, upload images and videos, create new relationships, etc. For example, social networking services and communication systems can execute on computing systems to enable users to communicate with each other through devices. The computing systems can operate in a distributed computing environment with data being distributed among and processed using resources. Resources can be located or grouped in various ways, such as for data centers, suites, or server racks.

Designated resource slots can be determined according to various reasons, parameters, or constraints, such as regarding required power, heat or cooling capacity, network capacity, associations or connections to other resources, etc. However, vastly numerous possibilities exist for arranging the resources, such as a set of server racks, within a large location, such as a server room or data center.

Conventionally, a set of engineers may take multiple days, if not weeks, to allocate the resources. Further, the number of possible allocations, groupings and combinations are too vast for human computation to accurately assess optimal allocations. As such, there is a need to automatically allocate the resources for a given set of locations and assess the allocations according to the reasons, parameters, or constraints associated with the resource allocation to promote optimum operation of the computing system.

Figure 1:
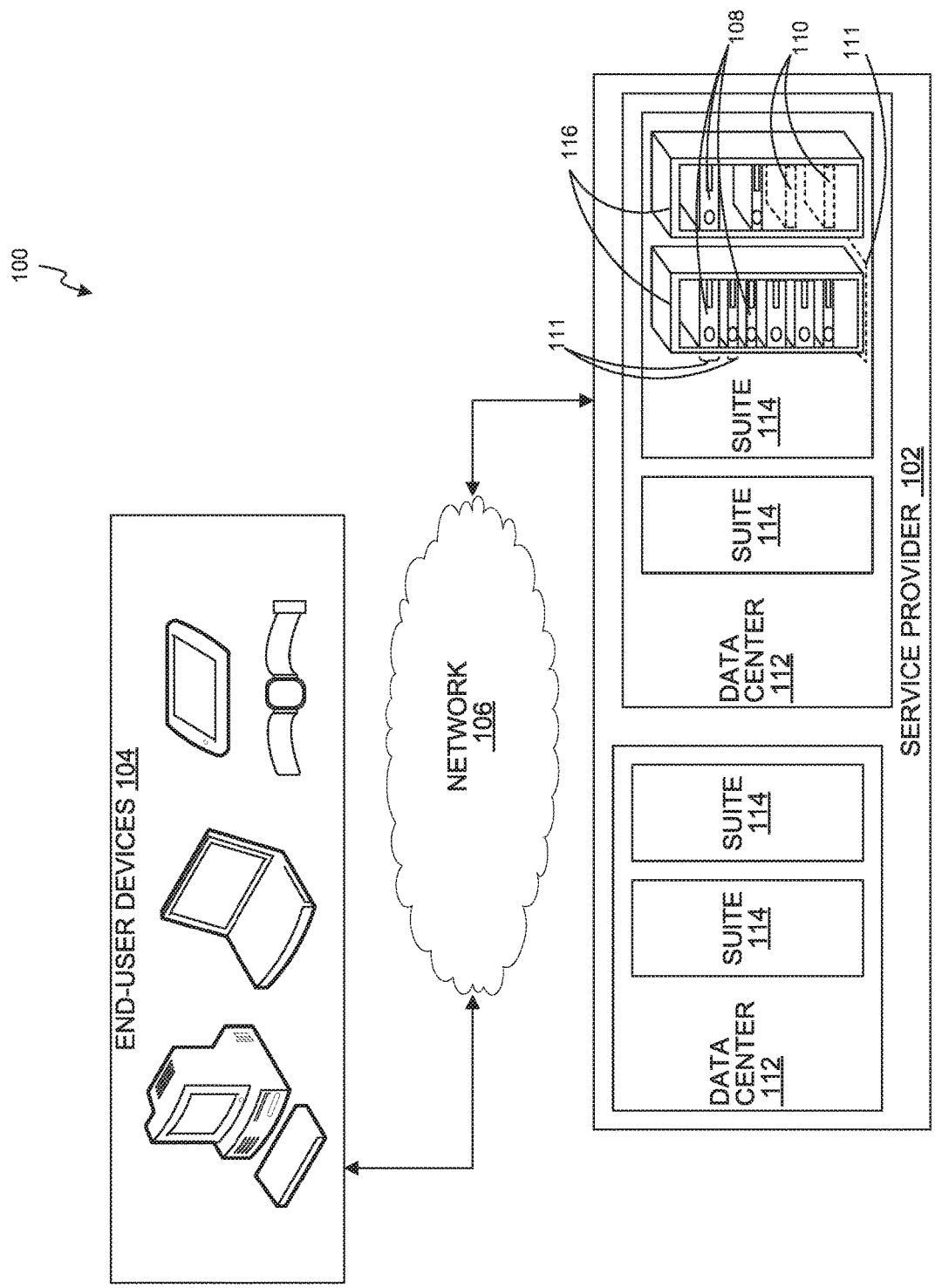
FIG. 1 is block diagram illustrating an overview of a computing system in which some embodiments may operate.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Various embodiments are directed to automatically assigning computing resources, such as servers, to optimal physical locations in or across housing structures, such as server racks, suites, data centers, or a combination thereof. Real-world parameters, such as layouts or maps of the data centers or the suites for housing the computing resources, information regarding the available structures, such as server racks, or characteristics thereof, information regarding available resources, such as traits or ratings thereof, or a combination thereof, can be translated into an optimization function.

The layout or maps can be translated or captured as an opening layout for locating open locations for potentially housing the resources. The details regarding the structures can be translated or captured as an available-housing set representing a number of available structures, identification or classification of the available structures, or a combination thereof. The available-housing set can further include rack characterization for each of the available structures, such as for representing power constraints, cooling constraints, network loading constraints, or a combination thereof for the available server racks. The details regarding the computing resources can be translated or captured as resource characterization, such as for representing energy consumption or rating, thermal characteristic or rating, connection or communication capacity, type, or a combination thereof for the available or targeted servers.

In some embodiments, a constraint-translation mechanism, such as a programming language, a library, a tool set, or a combination thereof specific for the optimization function, can be used to translate or capture the real-world parameters. As a more specific example, the constraint-translation mechanism can include Python, CVXPY, PuLP, etc.

In some embodiments, a solver mechanism, such as ECOS or XPRESS, can be used to process the optimization function. The solver mechanism can process and evaluate numerous different possible combinations and outcomes as represented in an evaluation set. The solver mechanism can determine the optimal placement or allocation of the resources based on balancing constraints, such as power/energy, cooling/heating, network capacity/connections, etc. The solver mechanism can determine the optimal placement or allocation corresponding to even or minimal loading across the available structures, while satisfying all the constraints or requirements for all resources and all structures.

In some embodiments, the solver mechanism can determine designated locations for the available or targeted resources corresponding to the optimization output. The designated locations can include a set of binary location parameters each representing whether the resource should be placed at a particular open location for optimum output.

The optimization function can be processed in a variety of ways. For example, the optimal placements or allocations can be processed using an integer optimization mechanism to directly calculate the binary location parameters in some embodiments.

Also for example, the optimal placements or allocations can be processed using a linear optimization mechanism for initial approximation, and then using a post processing mechanism, such as for implementing heuristics or greedy algorithm to account for any offsets or discrepancies introduced by the initial approximation in some embodiments. The linear optimization mechanism can calculate a decision approximation as the initial approximation, with values ranging from '0.0' to '1.0'. The initial approximation can be rounded according to a rounding threshold. The post processing mechanism can be implemented to account for any offsets or discrepancies introduced by the approximation and the rounding. The optimal placements or allocations can be processed in an iterative manner in some embodiments.

Based on mapping, translating, or capturing the real-world parameters associated with placing or allocating the computing resources, the placing or allocating of the computing resources can be automated. Optimum solution for placement, one that evens out the loads across the available server racks while addressing the various constraints, can be achieved using circuits, computing devices, functions, instructions, or a combination thereof. The optimum solution of the designated locations can be found by analyzing and comparing a vast amount or a full set of different possibilities or combinations.

Such processing of large set of possibilities or combinations are enabled based on the ability to use computers and devices to place or allocate the resources. The solution can be optimal in comparison to human placements that often rely on one's experience or sense due to the analysis and comparison of large amounts of different possibilities or combinations impractical human minds. Further, the overall process can be shortened from days or weeks, such as when done by human processes, to a day or less using the computer-implemented process. Details regarding the computer-implemented process are discussed in detail below.

Referring now to the figures, FIG. 1 is block diagram illustrating an overview of a computing system 100 in which some embodiments may operate. The computing system 100 can include a social networking system or a communication system. The computing system 100 can include a service controller 102 connecting to and exchanging information with end-user devices 104 through an external network 106.

The service controller 102 can include a circuit, a devices, a system, a function, or a combination thereof configured to manage communication or exchange of data between devices. For example, the service controller 102 can correspond to a social networking service, a telecommunication service, a wireless communication service, an internet service provider (ISP), or a combination thereof. As a more specific example, the service controller 102 can include a data center, a mainframe computer, a server, or a combination thereof.

For illustrative purposes, the service controller 102 is discussed below in relation to a social networking service. However, it is understood that the computing system 100 and the various embodiments discussed below can be applied to contexts or usage outside of social networking contexts, such as for allocating hardware at base stations, service stations, routers or switches.

The end-user devices 104 can include one or more client computing devices (e.g., a wearable device, a mobile device, a desktop computer, a laptop, etc.). The end-user devices 104 may operate in a networked environment using logical connections to one or more remote computers. The end-user devices 104 can connect to each other or other end-user devices 104, the service controller 102, or a combination thereof. The end-user devices 104 can connect using the external network 106.

The external network 106 can include wired or wireless networks connecting various devices for communicating or exchanging data. For example, the external network 106 can include local area networks (LAN), wide area networks (WAN), wireless fidelity (WiFi) network, fiber optic networks, cellular network, the Internet, or a combination thereof.

The computing system 100 can include computing resources 108, such as servers. The computing resources 108 can include circuitry, device, instructions, functions, or a combination thereof configured to automatically process information. The computing resources 108 can include servers that provide functionalities to other programs or devices, such as for clients including the end-user devices 104. For example, the computing resources 108 can include servers of various types, such as database servers, file servers, web servers, game servers, application servers, etc.

The computing resources 108 can each include a unit of circuitry or a device configured to facilitate one or more aspects or functions for the service controller 102. For example, the computing resources 108 can be switches, cores or central processing units (CPU), storage devices, etc. Also for example, the computing resources 108 can be servers that provide functionality for other programs or devices acting as clients. As a more specific example, the computing resources 108 can include database servers, file servers, mail servers, web servers, application servers, etc.

For illustrative purposes, the computing system 100 is described below in the context of distributing, placing, or allocating servers 108 for the computing resources 108. However, it is understood that the computing system 100 can be for allocating other resources, such as cores, processors, memory devices, etc.

The computing system 100 can automatically assess open locations 110 and determine designated locations 111 to allocate the computing resources 108 such as the servers 108. The open locations 110 can include physical spaces, slots, positions, a representation thereof, or a combination thereof empty and not occupied by any resources or circuitry at the time of processing.

The designated locations 111 can be a specific address or a physical site assigned or allocated to specific instances of the server 108. The computing system 100 can generate the designated locations 111 based on assigning one of the servers 108 to a specific instance of the open locations 110. The designated locations 111 can include information tying, placing or locating, assigning, or a combination thereof for the servers 108 to the open locations 110.

The computing system 100 can generate the designated locations 111 for physically allocating, placing or locating, distributing, or a combination thereof for the servers 108. The computing system 100 can allocate the servers 108 by determining the designated locations 111 from the open locations 110. The computing system 100 can allocate the servers 108 based on evaluating various possible combinations of the designated locations 111 according to one or more parameters, constraints, characteristics or traits, etc.

For example, the computing system 100 can arrange or assign physical locations for the servers 108 within or across one or more data centers 112, one or more suites 114, server racks 116, etc. The data centers 112, suites 114, the server racks 116 can each be a housing structure corresponding to a unique grouping for a set of the servers 108.

The server racks 116 can include frames or enclosures for mounting one or more servers 108. The server racks 116 can be used to affix the servers 108 in space. The suites 114 can include big rooms or enclosed space dedicated to house the servers 108. The server racks 116 can further provide necessities for the servers 108, such as power, network connections, cooling or heat management, etc. The server racks 116 can further include the open locations 110.

The suites 114 can be large rooms. The suites 114 can include or house the server racks 116. For example, the suites 114 can include or house hundreds or thousands or more servers. The data centers 112 can include or house one or more of the suites 114.

The computing system 100 can translate and quantify real-world parameters, constraints, characteristics or traits, etc. for locating and arranging the servers 108. The computing system 100 can automatically assess various possible locations and combinations as an optimization problem. The computing system 100 can determine the designated locations 111 for optimally locating or arranging the servers 108 across the open locations 110. Details for allocating the servers 108 are discussed below.

It should be noted that the term "server" as used throughout this application refers generally to a computer, an electronic device, a program, or any combination thereof that processes and responds to requests (e.g., from the end-user devices 104 or from other servers). Servers can provide data to the requesting "clients." The term "client" as used herein refers generally to a computer, a program, an electronic device, or any combination thereof that is capable of processing and making requests and/or obtaining and processing any responses from servers. Client computing devices and server computing devices may each act as a server or client to other server/client devices.

Figure 2:
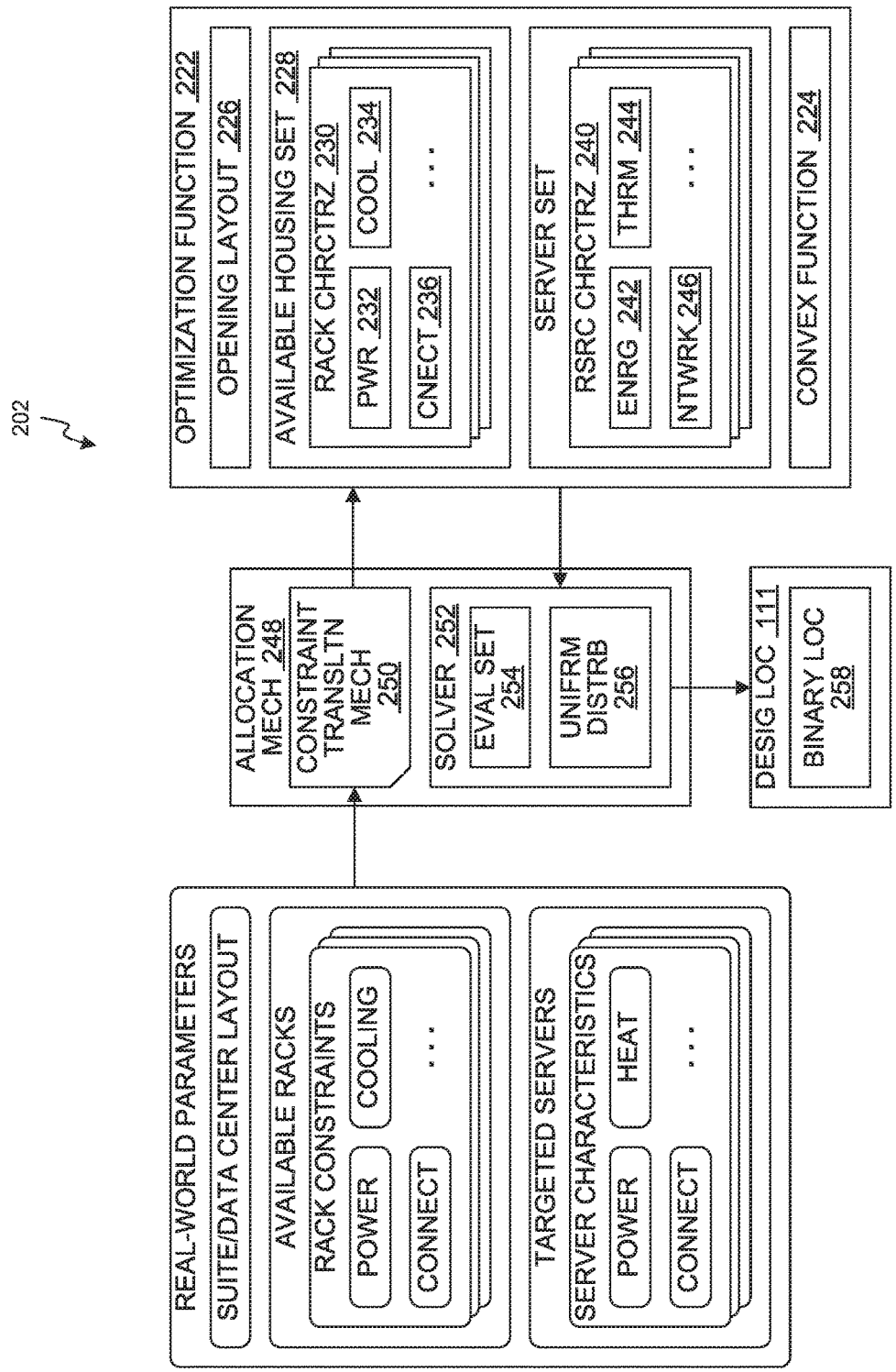
FIG. 2 is an example data flow diagram for placing or allocating the servers of FIG. 1, in accordance with various embodiments.

FIG. 2 is an example data flow diagram for placing or allocating the servers 108 of FIG. 1, in accordance with various embodiments. The computing system 100 can translate or capture real-world parameters associated with placing or allocating the servers 108 into an optimization function 222.

The optimization function 222 is a statement or an arrangement for enabling search of a solution closest to a desired condition or outcome from a set of feasible solutions. The optimization function 222 can state a problem to be solved. For example, the optimization function 222 can frame, capture, or restate an objective of placing or allocating the servers 108 into the open locations 110 of FIG. 1 as an optimization problem. The optimization function 222 can be machine-readable, and can be processed using one or more processors.

The optimization function 222 can be a convex optimization function 224. The real-world parameters can be captured, translated, and arranged as a convex function over convex sets. The computing system 100 can process the convex optimization function 224 to find minimum values, such as local minimum values in finding the optimum solution.

The computing system 100 can access and process real-world parameters translated or captured for the optimization function 222. The optimization function 222 can include representations of various real-world parameters or constraints. For example, the optimization function 222 can include representations and information associated with the servers 108, the open locations 110, housing structure, characteristics or traits thereof, or a combination thereof.

The optimization function 222 can be based on an opening layout 226. The opening layout 226 can include a description of physical locations or space for the open locations 110, the housing structure for the servers 108, or a combination thereof. The opening layout 226 can describe or represent a physical space intended to hold or house the servers 108.

For example, the opening layout 226 can include a space layout, general spacing, positions, or a combination thereof for the open locations 110, the server racks 116 of FIG. 1, or a combination thereof in or across one or more of the suites 114 of FIG. 1, one or more of the data centers 112 of FIG. 1, or a combination thereof. As a more specific example, the opening layout 226 can include a machine readable map, schematic, floor plan, list, etc.

The optimization function 222 can be based on an available-housing set 228. The available-housing set 228 can include descriptions of the server racks 116 available for the placement or allocation of the servers 108. The available-housing set 228 can capture or represent constraints associated with the server racks 116. For example, the available-housing set 228 can include a number of available racks, an identifier or a type of each of the available racks, or a combination thereof.

Also for example, the available-housing set 228 can include a rack characterization 230 for each of the server racks 116 available for placement or allocation of the servers. The rack characterization 230 can describe or represent traits or characteristics of the corresponding server rack. As a more specific example, the rack characterization 230 can include a power parameter 232, a cooling parameter 234, a connection parameter 236, or a combination thereof.

The power parameter 232 can include a description or a representation of voltage, power, current, or a combination thereof available at or for the corresponding server rack. The power parameter 232 can capture or represent real-world constraints or limits associated with power sources available at the corresponding server rack. For example, the power parameter 232 can include power rating, voltage level, current rating, or a combination thereof for the corresponding server rack, the suite or the data center of the corresponding server rack, or a combination thereof.

The cooling parameter 234 can include a description or a representation of heat-regulating or cooling characteristics at the corresponding server rack. The cooling parameter 234 can capture or represent real-world constraints or limits associated with capacity of available cooling shafts or fans for the corresponding server rack, the suite or the data center of the corresponding server rack, or a combination thereof. For example, the cooling parameter 234 can include a thermal profile, a rating or a category for the cooling shafts, a factor or a rate associated with the cooling capacity, etc.

The connection parameter 236 can include a description or a representation of characteristics associated with communication of data between servers. The connection parameter 236 can capture or represent real-world parameters or limits associated with data communication for the corresponding server rack, the suite or the data center of the corresponding server rack, or a combination thereof. For example, the connection parameter 236 can include a connection diagram or available direct connections for communication lines, identification of surrounding or nearby server racks, or a combination thereof. The connection parameter 236 can be used to optimize the communication of data by placing or clustering servers that frequently communicate with each other.

The optimization function 222 can be based on an available server set. The available server set can include descriptions of the servers 108 available or targeted for the placement or allocation. The available server set can capture or represent performance characteristics, requirements, or features associated with the servers 108. For example, the available server set can include a number of available servers, an identifier or a categorization for each of the available racks, or a combination thereof.

Also for example, the available server set can include a resource characterization 240 for each of the servers 108 available for placement or allocation. The resource characterization 240 can describe or represent traits or characteristics of the corresponding server. As a more specific example, the resource characterization 240 can include an energy parameter 242, a thermal parameter 244, a network load parameter 246, or a combination thereof.

The energy parameter 242 can include a description or a representation of real-world parameters associated with voltage, power, current, or a combination thereof required or consumed by the corresponding server for operation thereof. For example, the energy parameter 242 can include power rating, required voltage level, current rating, or a combination thereof for the corresponding server.

The thermal parameter 244 can include a description or a representation of heat generated by the corresponding server during operation thereof. For example, the thermal parameter 244 can include a heat signature, an operating thermal output, an average or a typical temperature level, or a combination thereof.

The network load parameter 246 can include a description or a representation of communication capacity or characteristic of the corresponding server. For example, the network load parameter 246 can include a number of available connections, processing speed or capacity, or a combination thereof for communicating and processing data at the corresponding server. Also for example, the network load parameter 246 can include a type or an identity of a complementary or frequently-communicating server.

The computing system 100 can process the optimization function 222 using a server-allocation mechanism 248. The server-allocation mechanism 248 can include a method, a process, a function, a circuit, an instruction, a configuration or a combination thereof for determining optimal placements or allocations for a set of the servers 108 into the server racks 116 distributed in or across one or more of the suites 114 or one or more of the data centers 112. The server-allocation mechanism 248 can include a constraint-translation mechanism 250 and a solver mechanism 252.

The real-world parameters can be captured or translated using the constraint-translation mechanism 250. The constraint-translation mechanism 250 is a method, a process, a function, a circuit, an instruction, a configuration or a combination thereof for capturing or translating the real-world parameters into machine-readable statements for an optimization process that can be evaluated. The constraint-translation mechanism 250 can allow mathematical problems or statements to be described in computer-readable format for an optimization problem.

For example, the constraint-translation mechanism 250 can include computer languages, platforms, libraries, functions or features, toolkits, or a combination thereof suited or designed for processing optimization problems. As a more specific example, the constraint-translation mechanism 250 can include Python programming language, CVXPY modeling language, PuLP library, etc.

The real-world parameters can be captured or translated into a set of constraints associated with the available or targeted servers 108 and the available server racks 116. The constraints can be expressed in machine-readable formats or mathematical expressions through the constraint-translation mechanism 250. For example, the constraint-translation mechanism 250 can be used to capture or translate device specifications and room characteristics into machine-readable formats or mathematical expressions for the optimization function 222.

Further, an objective, a goal, or a desired condition or result for the optimization problem can be expressed in a machine-readable format. The objective or the goal of placing or allocating the servers 108 according to a uniform distribution requirement 256 can be captured, translated, and phrased using the constraint-translation mechanism 250.

The uniform distribution requirement 256 is a desired condition or requirement for achieving even loading across the server racks 116, such as for power, communication, cooling, or a combination thereof, resulting from placing or allocating the servers 108. The computing system 100 can further use other requirements or conditions for placing or allocating the servers 108, such as to minimize overall heat level, to minimize communication latency, etc.

The solver mechanism 252 can include a method, a process, a function, a circuit, an instruction, a configuration or a combination thereof for finding an optimum allocation or placement of the servers 108.

The solver mechanism 252 can evaluate the numerous different possibilities or combinations of placements or allocations of the servers 108 included in an evaluation set 254. The computing system 100 implementing the server-allocation mechanism 248 can generate or determine the various different possibilities or combinations of placements or allocations of the servers 108 for the evaluation set 254.

The evaluation set 254 can include all possible combinations of placements or allocations of the servers 108 for the given set of server racks 116, the suites 114, the data center 112, or a combination thereof. The evaluation set 254 can also include the possible combinations of placements or allocations according to or meeting certain conditions or requirements.

The solver mechanism 252 can compare the conditions or estimated results, such as for heat, power consumption, network load or latency, or a combination thereof for each unique set of placements or each combination in the evaluation set 254. The solver mechanism 252 can find the optimum allocation or the placement according to the uniform distribution requirement 256 and any other requirements or conditions based on the comparison.

For example, the solver mechanism 252 can include solver engines or optimization solver engines. As a more specific example, the solver mechanism 252 can include embedded conic solver (ECOS) or)(PRESS.

The computing system 100 can use the solver mechanism 252 to process the optimization function 222 and generate the designated locations 111 representing the optimum locations or placements of the servers 108. The computing system 100 can generate the designated locations 111 based on calculating binary location parameters 258.

The solver mechanism 252 can calculate the binary location parameters 258 representing whether or not a server is to be located or placed in a particular instance of the open location 110. The binary location parameters 258 can represent presence or absence of a server in the corresponding open locations 110 for the optimum solution of placements or allocations of the servers 108.

Figure 3:
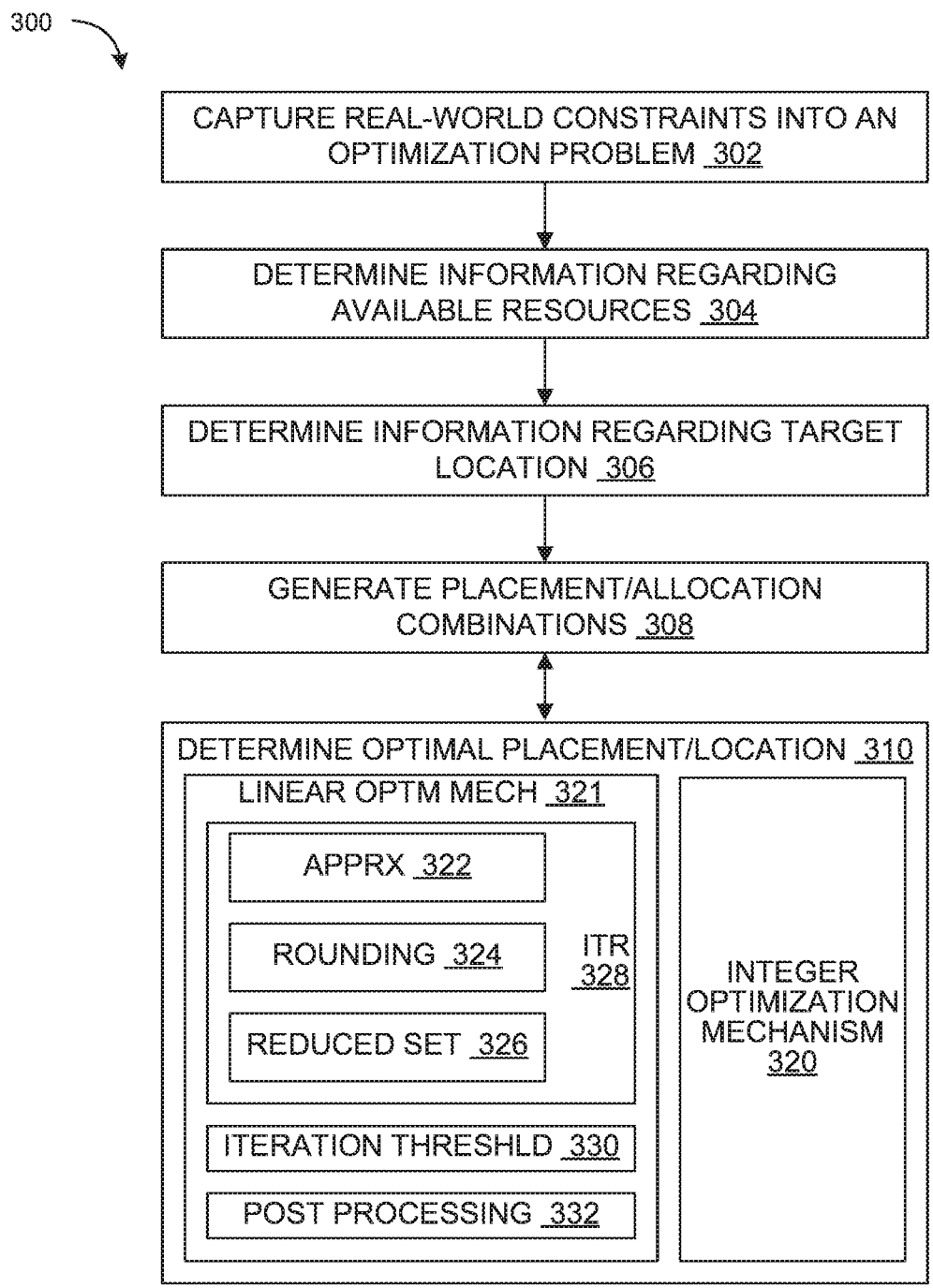
FIG. 3 is a flow chart illustrating a method of operating the computing system of FIG. 1, in accordance with various embodiments.

FIG. 3 is a flow chart illustrating a method 300 of operating the computing system 100 of FIG. 1, in accordance with various embodiments. The computing system 100 can process the optimization function 222 of FIG. 2 capturing or representing real-world parameters or constraints corresponding to placing or allocating the servers 108 of FIG. 1 into the open locations 110 of FIG. 1 in or across one or more suites 114 of FIG. 1, or in or across one or more data centers 112 of FIG. 1. The computing system 100 can process the optimization function 222 including representations of characteristics, traits, capacity or capabilities, or a combination thereof associated with the servers 108, the server racks 116 of FIG. 1, or a combination thereof.

At block 302, real-world parameters and constraints can be captured or translated into an optimization problem for placing or allocating the servers 108. The real-world parameters represented by the available-housing set 228 of FIG. 2, the opening layout 226 of FIG. 2, the resource characterization 240 of FIG. 2, or a combination thereof can be captured, phrased, or arranged into a computer-readable format corresponding to the convex optimization function 224 of FIG. 2.

For illustrative example, a developer or a system designer can generate software implementing the optimization function 222 using the constraint-translation mechanism 250. The developer or the designer can generate the software including statements, expressions, or instructions for evaluating parameters associated with placing or allocating the servers 108 as the convex optimization function 224.

The optimization function 222 can include instructions for evaluating the available-housing set 228, the opening layout 226, the resource characterization 240, or a combination thereof according to the uniform distribution requirement 256 of FIG. 2 or any other objectives or goals. The optimization function 222 can be implemented using the constraint-translation mechanism, such as Python computer programming language, PuLP library or toolkit, CVXPY modeling language or extension, or a combination thereof.

At block 304, the computing system 100 can determine information regarding available resources. The computing system 100 can determine the information regarding the available set of the server racks 116, the servers 108, or a combination thereof. The computing system 100 can determine the available-housing set 228 of FIG. 2, the rack characterization 230 of FIG. 2, the resource characterization 240 of FIG. 2, or a combination thereof.

A user of the computing system 100 can identify various real-world parameters or representations thereof for the servers 108 and the server racks 116, such as for power requirements or constraints, thermal characteristics or constraints, network-connectivity characteristics or constraints, or a combination thereof. For example, the user can identify or provide a number of the available server racks 116 with the open locations 110 designated for the allocation or placement of the servers 108. The computing system 100 can receive or access the user-provided information to determine the available-housing set 228 for representing the server racks 116 with the open locations 110 for housing the servers 108, where the server racks 116 are located in or designated to be located in one or more of the suites 114 or in one or more of the data centers 112.

The computing system 100 can determine the rack characterization 230 for representing one or more constraints, such as for power or cooling, associated with each of the available server racks. For example, the user can identify or provide identification, classification, or device specification of the available server racks 116. The computing system 100 can access or receive the user-provided information to determine the power parameter 232 of FIG. 2, the cooling parameter 234 of FIG. 2, the connection parameter 236 of FIG. 2 or a combination thereof from the identification, classification, or device specification of the available server racks 116. The computing system 100 can use a look-up table or a library for determining the rack characterization 230.

Also for example, the user can identify or provide information regarding power available at the server racks 116, information regarding cooling capacity of the server racks 116 or the suite housing the server racks 116, available connections at the server racks 116, or a combination thereof. The computing system 100 can determine the power parameter 232, the cooling parameter 234, the connection parameter 236 or a combination thereof as the user-specified information.

The user can further provide information regarding the servers 108. The computing system 100 can receive or access the user-provided information to determine the resource characterization 240 for representing one or more traits, such as energy consumption or requirement or thermal characteristics, associated with each of the servers. For example, the user can identify or provide desired or targeted set of the servers 108 for placement or allocation, such as a minimum quantity, a type or categorization, a physical size, or a combination thereof for the servers 108.

Also for example, the user can identify or provide identification, classification, or device specification of the desired or targeted set of the servers 108 intended for placement or allocation. The computing system 100 can determine the energy parameter 242 of FIG. 2, the thermal parameter 244 of FIG. 2, the network load parameter 246 of FIG. 2, the physical size, or a combination thereof from the identification, classification, or device specification of the servers 108. The computing system 100 can use a look-up table or a library for determining the resource characterization 240.

Also for example, the user can identify or provide information regarding power consumption or requirement of the servers 108, information regarding operating thermal characteristics of the servers 108, information regarding processing or communication requirements or characteristics of the servers 108, or a combination thereof. The computing system 100 can determine the power parameter 232, the cooling parameter 234, the connection parameter 236 or a combination thereof from the user-specified information.

The computing system 100 can determine the available-housing set 228, the rack characterization 230, and the resource characterization 240 representing translations of the identified real-world parameters captured into the optimization function 222 using the constraint-translation mechanism 250. The constraint-translation mechanism 250 can characterize the real-world parameters into the optimization function 222 in generating the designated locations 111.

At block 306, the computing system 100 can determine information regarding the targeted location. The computing system 100 can determine information regarding the open locations 110 in or across one or more of the suites 114, one or more of the data center 112, or a combination thereof intended for housing the servers 108.

The computing system 100 can determine physical locations, such as for spacing or positions, of the open locations 110 or the server racks 116 within or across the suites 114, the data center 112, or a combination thereof. The computing system 100 can further determine overall cooling capacity, average temperature, incoming energy characteristics, or a combination thereof for the suites 114, the data center 112, or a combination thereof. The computing system 100 can further determine the physical locations or other characteristics of the intended location based on the servers 108 already positioned or allocated therein.

The user can identify a type, a size, an identifier, or a combination thereof for the targeted suite, data center, or a combination thereof. The user can further identify or provide a map or a layout for the targeted location. The map can identify physical positions of the open locations 110 in the one or more suites 114, the one or more data centers 112, or a combination thereof.

The computing system 100 can determine the opening layout 226 based on receiving or accessing the user-provided information. The computing system 100 can use a look-up table or a list to determine the opening layout 226 corresponding to the user-provided identification, type, or size. The computing system 100 can further convert user-provided map or layout into computer-readable format, such as using optical recognition. The computing system 100 can further receive or access the computer-readable map or layout provided by the user as the opening layout 226. The computing system 100 can determine the opening layout 226 computer-readable representations of the open locations 110 available to house the servers 108.

At block 308, the computing system 100 can generate placement or allocation combinations. The computing system 100 can generate the evaluation set 254 of FIG. 2 including various unique combinations of possible placements or allocations of the servers 108.

The computing system 100 can generate the evaluation set 254 to include all possible combinations of placements or allocations of the servers 108 for the given set of the server racks 116, the open locations 110, the servers 108, or a combination thereof. The computing system 100 can generate the evaluation set 254 to include a particular subset of the possible combinations based on specific conditions or rules, such as for leaving certain slots open or unoccupied, minimum or maximum number of servers per server racks, etc. The computing system 100 can generate the evaluation set 254 using random generators or a systematic algorithm for identifying unique combinations of placements or allocations.

At block 310, the computing system 100 can determine optimal placements or locations for the resources. The computing system 100 can analyze the evaluation set 254 and compare result estimations for the unique combinations to determine the optimal placements or locations for the servers 108. The computing system 100 can use the solver mechanism 252 of FIG. 2 to generate the designated locations 111 representing the optimal placements or locations for the servers 108. The computing system 100 can generate the designated locations 111 as a solution to the optimization function 222.

The computing system 100 can implement the solver mechanism 252 to compare or analyze multiple or all possible allocation combinations of the evaluation set 254 according to the available-housing set 228, the opening layout 226, the rack characterization 230, and the resource characterization 240 translated for the optimization function 222. The computing system 100 can calculate an overall thermal profile, an overall power profile, an overall connection load profile, or a combination thereof for each of the unique combinations based on the available-housing set 228, the opening layout 226, the rack characterization 230, and the resource characterization 240.

The computing system 100 can implement the solver mechanism 252 to evaluate the overall thermal profile, the overall power profile, the overall connection load profile, or a combination thereof according to one or more desired goals or conditions, such as the uniform distribution requirement 256 of FIG. 2. The computing system 100 can generate the designated locations 111 as the optimal combination of placements or allocations for evenly distributing the energy parameters 242 and the thermal parameters 244 of the servers 108 across the available server racks 116 without exceeding the power parameter 232 and the cooling parameter 234 for each of the available server racks 116 according to the uniform distribution requirement 256.

The computing system 100 can analyze the various combinations and generate the designated locations 111 in a variety of ways. For example, the computing system 100 can use an integer optimization mechanism 320 or a linear optimization mechanism 321.

The linear optimization mechanism 321 is a method, a process, a function, a circuit, an instruction, a configuration or a combination thereof for finding optimum solutions or outcomes based on requirements or relationships between parameters are modeled as linear patterns. The optimization function 222 can be based on a linear objective function, subject to linear constraints.

The linear optimization mechanism 321 can be implemented based on a subset, a specific category, or a specific combination of the solver mechanism 252, the constraint-translation mechanism 250, or a combination thereof. For example, the integer optimization mechanism 320 can include or be based on)(PRESS, CVXPY, or a combination thereof.

The unknowns can be a real-number for the linear optimization mechanism 321. For example, the computing system 100 can implement the linear optimization mechanism 321 to calculate decision approximations 322 as any positive values, negative values, decimal values, or a combination thereof. As a more specific example, the decision approximations 322 can each be a value within a range including and between zero and one, or '$0.0<x<1.0$' with 'x' representing each of the decision approximations 322.

The decision approximations 322 are values each estimating the binary location parameters 258 of FIG. 2 representing whether a particular corresponding instance of the servers 108 is to be located in a particular corresponding instance of the open locations 110. The decision approximations 322 can correspond to a likelihood or a quantitative representation of appropriateness that a particular instance of the servers 108 is to be located in a particular instance of the open locations 110 for the optimum solution.

The computing system 100 can use or implement the linear optimization mechanism 321 to initially calculate the decision approximations 322 in generating the designated locations 111. The computing system 100 can calculate the binary location parameters 258 based on the decision approximations 322. The computing system 100 can further process the binary location parameters 258 to generate the designated locations 111.

For an illustrative example, the computing system 100 can initially calculate the decision approximations 322 using the linear optimization mechanism 321 as results including and between 0.0 and 1.0. The computing system 100 implementing the linear optimization mechanism 321 can calculate or generate the overall thermal profile, the overall power profile, the overall connection load profile, or a combination thereof for each of the unique combinations in the evaluation set 254.

Continuing with the example, the computing system 100 can calculate or generate estimations for the overall impact or result, such as for thermal behavior, power consumption, network load or speed, or a combination thereof, for a specific arrangement or placement of the servers 108 based on the available-housing set 228, the opening layout 226, the rack characterization 230, the resource characterization 240, a portion therein, or a combination thereof. The computing system 100 can aggregate or combine the energy parameters 242, the thermal parameter 244, the network load parameter 246, or a combination thereof across the servers 108 located in each of the server racks 116 for the corresponding combination to calculate or generate the estimations of the overall impact or result.

Continuing with the example, the computing system 100 can calculate the decision approximations 322 based on the overall impacts or results for the placement or allocation combinations in the evaluation set 254. The computing system 100 can calculate the decision approximations 322 according to the uniform distribution requirement 256 and/or any other optimization goals or objectives for the optimization function 222.

The computing system 100 can calculate the binary location parameters 258 based on the decision approximations 322. Continuing with the example, the computing system 100 can calculate the binary location parameters 258 based on rounding the decision approximations 322. The computing system 100 can round the values up or down a rounding threshold 324.

The rounding threshold 324 can be one or more predetermined real number values or ranges for deciding to place or allocate a specific server in a specific open location. The rounding threshold 324 can represent a satisfactory or sufficient level of likelihood, such as 51% or above, or of appropriateness for placing or allocating the corresponding server in the corresponding location for the optimum solution.

As a more specific example, the computing system 100 can round the decision approximations 322 meeting or exceeding the rounding threshold 324 up to integer or binary values representing the binary location parameters 258 corresponding to placing or allocating the corresponding server in the corresponding location for the optimum solution. Also as a more specific example, the computing system 100 can round the decision approximations 322 below the rounding threshold 324 down to integer or binary values representing the binary location parameters 258 corresponding to not placing or allocating the corresponding server in the corresponding location for the optimum solution. Also as a more specific example, the computing system 100 can ignore the binary location parameters 258 within a range or below the rounding threshold 324.

The computing system 100 can further calculate the binary location parameters 258 in an iterative manner. The computing system 100 can calculate the binary location parameters 258 based on repeating a set of instructions or processes in each processing iteration 328 up to a predetermined processing limit corresponding to an iteration threshold 330.

For example, the computing system 100 can calculate a set of the binary location parameters 258, such as based on initial approximation and rounding as discussed above, in or for an iteration. For the first instance of the processing iteration 328, the computing system 100 can analyze the entirety of the evaluation set 254 corresponding to a full set of the open locations 110 to calculate the set of the binary location parameters 258. The computing system 100 can adjust the open locations 110 to generate a reduced opening set 326 based on the binary location parameters 258.

Continuing with the example, the computing system 100 can generate the reduced opening set 326 based on removing assigned, settled, or occupied instances of the open locations 110 according to the binary location parameters 258. The computing system 100 can generate the reduced opening set 326 based on excluding instances of the open locations 110 having the binary location parameters 258 assigned or calculated based on the decision approximations 322 for the corresponding open locations 110 meeting or exceeding the rounding threshold 324. The computing system 100 can further reduce the number of or the set of targeted or available servers 108 accordingly.

Continuing with the example, the computing system 100 can repeat the process for the reduced opening set 326 instead of the full initial set of the open locations 110 for subsequent instances of the processing iteration 328. The computing system 100 can analyze placement or allocation combinations for or corresponding to the reduced opening set 326 in subsequent iterations to calculate the binary location parameters 258. The computing system 100 can further update or adjust the reduced opening set 326 based on the resulting values of the binary location parameters 258 of each iteration as discussed above.

Continuing with the example, the computing system 100 can iteratively calculate the binary location parameters 258 or iteratively generating the designated locations 111 based on repeating the processing iteration 328 up to or according to the iteration threshold 330. For each processing iteration 328, the computing system 100 can reduce the open locations 110 corresponding to the designated locations 111 or the corresponding binary location parameters 258, until the iteration threshold 330 is met or reached.

Also for example, the computing system 100 can iteratively calculate the binary location parameters 258 based on analyzing different sets or groupings of the servers 108. The computing system 100 can select or designate a unique subset or grouping of the servers 108, such as based on a similar type or characteristic amongst the servers 108, for each processing iteration 328. The computing system 100 can calculate the binary location parameters 258 based on the combinations for placing or allocating the unique subset or grouping for each iteration. The computing system 100 can generate or update the reduced opening set 326 as discussed above. The computing system 100 can repeat the processing iterations 328 and analyze different subsets or groupings of the servers 108 up to the iteration threshold 330 corresponding to a limit for available servers, a limit for available locations, optimum number of iterations, or a combination thereof.

The computing system 100 can generate the designated locations 111 based on a post processing mechanism 332. The post processing mechanism 332 is a method, a process, a function, a circuit, an instruction, a configuration or a combination thereof for finalizing the designated locations 111 based on adjusting the binary location parameters 258. The post processing mechanism 332 can be for assigning or allocating the servers 108 into remaining instances of the open locations 110.

The post processing mechanism 332 can also be for adjusting the designated locations 111 to account for or correct for any inaccuracies or discrepancies resulting from approximating the binary location parameters 258. The post processing mechanism 332 can remove one or more placements or allocations exceeding a number of available servers, or a combination thereof.

The computing system 100 implementing the post processing mechanism 332 following the linear optimization mechanism 321 can remove or reset the binary location parameters 258 exceeding a number of available or targeted servers. The computing system 100 can remove or reset the binary location parameters 258 by assigning the binary value representing that the corresponding location is open or unoccupied by any server. The computing system 100 can remove or reset the binary location parameters 258 according to heuristics or greedy algorithms to finalize the designated locations 111 and the binary location parameters 258 therein.

The computing system 100 can also use the integer optimization mechanism 320 to calculate the binary location parameters 258 and generate the designated locations 111. The integer optimization mechanism 320 is a method, a process, a function, a circuit, an instruction, a configuration or a combination thereof for finding optimum solutions or outcomes based on one or more integer parameters.

The integer optimization mechanism 320 can be implemented based on a subset, a specific category, or a specific combination of the solver mechanism 252, the constraint-translation mechanism 250, or a combination thereof. The unknowns can be binary for the integer optimization mechanism 320. For example, the integer optimization mechanism 320 can include or be based on ECOS, PuLP, or a combination thereof.

The computing system 100 can use or implement the integer optimization mechanism 320 to directly solve for the binary location parameters 258. The binary location parameters 258 can be included in the designated locations 111, where each of the binary values represent whether a particular corresponding instance of the servers 108 is to be located in a particular corresponding instance of the open locations 110.

The computing system 100 can use or implement the integer optimization mechanism 320 to directly solve for and directly calculate the binary location parameters 258 from analyzing the evaluation set 254. For example, the computing system 100 can directly calculate the binary location parameters 258 without using any linear or real-number estimations thereof.

As a more specific example, the computing system 100 can directly calculate the binary location parameters 258 without using the decision approximation 322, the linear optimization mechanism 321, or a combination thereof initially estimating the binary location parameters 258. Since the binary location parameters 258 are directly calculated, no post processing or adjustments are necessary to generate the designated locations 111 for the integer optimization mechanism 320.

It has been discovered that using automated processing for analyzing allocation or placement combinations of the servers 108 into the open locations 110 as an optimization function 222 allows even load distribution for heat, power, and communication. The optimization can be captured into machine-readable formats based on the opening layout 226, the available-housing set 228, the rack characterization 230, the resource characterization 240, or a combination thereof using the constraint-translation mechanism 250. The representations of various relevant real-world parameters and constraints can be evaluated and compared for multiple different combinations or possibilities of placements or allocations for hundreds or thousands of servers 108 or more. Using computing devices or circuits, the multiple different combinations or possibilities can be generated and evaluated in timely format in comparison to human efforts or processes, which typically takes multiple days for multiple members of different engineering disciplines. The optimization function 222 would be 'NP-hard' level of complexity, and impractical for human processing.

Computing devices can even consider all possible location or placement combinations to generate the designated locations 111 as the true or fully optimal solution for placing or allocating the servers 108. The full set of all possible location or placement combinations for the evaluation set 254 would be too numerous for human processing or analysis.

It has further been discovered that generating the designated locations 111 based on initially calculating the decision approximations 322 and rounding the values to calculate the binary location parameters 258 provides capability of finding optimum allocations or placements for resources using reduced amount of processing requirements or burdens. The amount of processing power and time, and the memory requirements can be less for the approximating and rounding in comparison to the integer optimization mechanism 320. Further the linear optimization mechanism 321 can allow for a wider variety or selection of the solver mechanism 252 than the integer optimization mechanism 320. The computing system 100 can use or implement less powerful or complex solvers to find the optimum solutions.

It has further been discovered that iteratively calculating the binary location parameters 258 based on rounding initial approximations and readjusting the open locations 110 accordingly, and subsequently adjusting the binary location parameters 258 using the post processing mechanism 332 to generate the designated locations 111 provides efficient processing in determining optimum placement or allocation of resources. The iterative approach can reduce or limit the amount of processing burden or requirement at one time by effectively dividing the process and the corresponding requirements or burdens over iterations. Further, the post processing mechanism 332, as discussed above, can correct for any inaccuracies or discrepancies introduced during the processing to maintain the optimal solution.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

For illustrative purposes, the computing system 100 has been described above in the context of the social networking system or a communication system. However, it is understood that the computing system 100 can be applicable to different contexts, such as a network or a combination of devices or circuit components.

Figure 4:
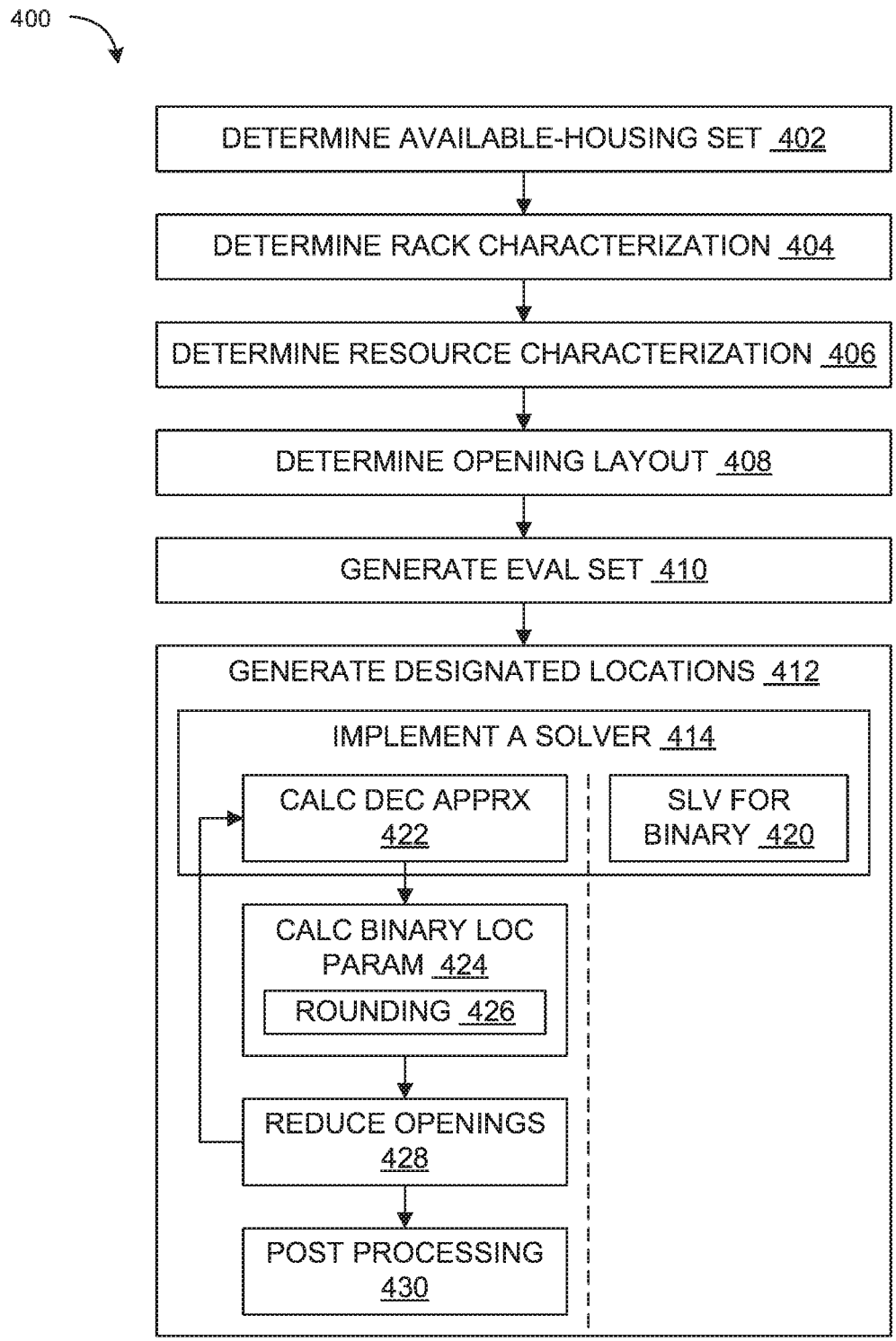
FIG. 4 is a detailed example flow chart illustrating a method of operating the computing system of FIG. 1, in accordance with various embodiments.

FIG. 4 is a detailed example flow chart illustrating a further method 400 of operating the computing system 100 of FIG. 1, in accordance with various embodiments. The further method 400 can be based on or similar to the method 300 of FIG. 3.

At block 402, the computing system 100 can determine the available-housing set 228 of FIG. 2. The computing system can determine the available-housing set 228 for representing the available server racks 116 of FIG. 1 with the open locations 110 of FIG. 1 for housing the servers 108 of FIG. 1 as discussed above.

The computing system 100 can determine by receiving or accessing information, such as a number of the available server racks 116, identification information for each of the server racks 116, or a combination thereof identified by a user, a designer, an engineer, or a combination thereof. The computing system 100 can determine the available-housing set 228 representing translations of the identified real-world parameters captured using the constraint-translation mechanism 250 of FIG. 2 for characterizing the real-world parameters into the optimization function 222 of FIG. 2 in generating the designated locations 111 of FIG. 1.

At block 404, the computing system 100 can determine the rack characterization 230 of FIG. 2. The computing system 100 can determine the rack characterization 230 for representing one or more constraints associated with each of the available server racks 116 as discussed above.

The computing system 100 can determine by receiving or accessing information, such as real-world characteristics or constraints of the available server racks 116, including parameters for power, cooling, connection, or a combination thereof identified by a user, a designer, an engineer, or a combination thereof. The computing system 100 can determine the rack characterization 230 representing translations of the identified real-world parameters captured using the constraint-translation mechanism 250.

At block 406, the computing system 100 can determining the resource characterization 240 of FIG. 2. The computing system 100 can determine the resource characterization 240 for representing one or more traits associated with each of the servers 108 available for placement as discussed above.

The computing system 100 can determine by receiving or accessing information, such as real-world characteristics or constraints of the available servers 108, including parameters for power consumption, heating characteristic, connectivity, or a combination thereof identified by a user, a designer, an engineer, or a combination thereof. The computing system 100 can determine the resource characterization 240 representing translations of the identified real-world parameters captured using the constraint-translation mechanism 250.

At block 408, the computing system 100 can determine the opening layout 226 of FIG. 2. The computing system 100 can determine the opening layout 226 for representing or locating the open locations 110 available to house the servers 108 as discussed above.

The computing system 100 can determine by receiving or accessing information, such as map or a layout of the data centers 112 of FIG. 1 or the suites of FIG. 1 identified by a user, a designer, an engineer, or a combination thereof. The computing system 100 can determine the opening layout 226 representing translations of the identified real-world parameters captured using the constraint-translation mechanism 250.

The blocks 402, 404, 406, and 408 can correspond to the blocks 302, 304, and 306 of FIG. 3. For example, the blocks 402 and 404 can correspond to the block 302, the block 304, or a combination thereof. Also for example, the block 406 can correspond to the block 302, the block 304, or a combination thereof. Also for example, the block 408 can correspond to the block 302, the block 306, or a combination thereof.

At block 410, the computing system 100 can generate the evaluation set 254 of FIG. 2. The computing system 100 can generate the evaluation set 254 representing multiple or all possible allocation combinations of the servers 108 into the open locations 110 as discussed above for the block 308 of FIG. 3.

At block 412, the computing system 100 can generate the designated locations 111. The computing system 100 can generate the designated locations 111 for placing the servers 108 in the open locations 110 as discussed above. The computing system 100 can generate the designated locations 111 based on analyzing the evaluation set 254 for various possible allocation or placement of the servers 108 into the open locations 110 as or according to the optimization function 222. The block 412 can correspond to the block 310 of FIG. 3.

The computing system 100 can generate the designated locations 111 by determining optimum locations or placements of the servers 108 based on analyzing the evaluation set 254. The computing system 100 can generate the designated locations 111 according to the uniform distribution requirement 256 of FIG. 2 for evenly distributing the energy parameters 242 of FIG. 2 and the thermal parameters 244 of FIG. 2 of the servers 108 across the available server racks 116 without exceeding the power parameter 232 of FIG. 2 and the cooling parameter 234 of FIG. 2 for each of the available server racks 116.

At block 414, the computing system 100 can implement the solver mechanism 252 of FIG. 2 to generate the designated locations 111. The computing system 100 can implement the solver mechanism 252 to compare the various possible allocation combinations of the evaluation set 254 according to the available-housing set 228, the opening layout 226, the rack characterization 230, and the resource characterization 240 translated for the optimization function 222 as discussed above. For example, the computing system 100 can implement the integer optimization mechanism 320 of FIG. 2 or the linear optimization mechanism 321 of FIG. 2 to generate the designated locations 111.

At block 420, the computing system 100 can solve for the binary location parameters 258 of FIG. 2 using the integer optimization mechanism 320 as discussed above. The computing system 100 can directly solve for or calculate the binary values representing whether a particular instance of the servers 108 is to be located in a particular instance of the open locations 110. The computing system 100 can directly solve for or calculate the binary values without using the decision approximation 322 of FIG. 2 initially estimating the binary location parameter 258.

At block 422, the computing system 100 can calculate the decision approximations 322 using the linear optimization mechanism 321 as discussed above. The computing system 100 can implement the linear optimization mechanism 321 instead of the integer optimization mechanism 320. The computing system 100 can implement the linear optimization mechanism 321 to calculate a value within a range including and between zero and one corresponding to or estimating the binary location parameter 258.

At block 424, the computing system 100 can calculating the binary location parameters 258 based on the decision approximations 322 as discussed above. For example, the computing system 100 can calculate the binary location parameter 258 based on rounding the decision approximations 322 up or down according to the rounding threshold 324 of FIG. 3 as represented at block 426.

At block 428, the computing system 100 can determine a reduced instance of the open locations 110 based on the binary location parameters 258. The computing system 100 can generate the reduced opening set 326 of FIG. 3 based on removing the designated locations 111 corresponding to the calculated binary location parameters 258 from the open locations 110 as discussed above.

The computing system 100 can further generate the designated locations 111 using an iterative process as discussed above. The computing system 100 can calculate the binary location parameter 258 for a subset of the open locations 110 in an iteration, such as for the blocks 422, 424, and 426.

The computing system 100 can regenerate or update the evaluation set 254 to generate the reduced opening set 326, similarly as discuss in the block 410. In a subsequent iteration, the computing system 10 can generate the designated locations 111 based on the reduced instance of the open locations 110 represented by the reduced opening set 326. The computing system 100 can iteratively generate the designated locations 111 and reduce the open locations 110 accordingly, up to the iteration threshold 330 of FIG. 3.

At block 430, the computing system 100 can implement the post processing mechanism 332 of FIG. 3 as discussed above. The computing system 100 can implement the post processing mechanism 332 to finalize the designated locations 111. The computing system 100 can implement the post processing mechanism 332 to adjust the designated locations 111 or the binary location parameters 258 resulting from the rounding operation. For example, the computing system 100 can implement the post processing mechanism 332 to assign any remaining servers 108 into remaining open locations 110, to remove one or more placements or allocations exceeding a number of available servers 108, or a combination thereof.

Figure 5:
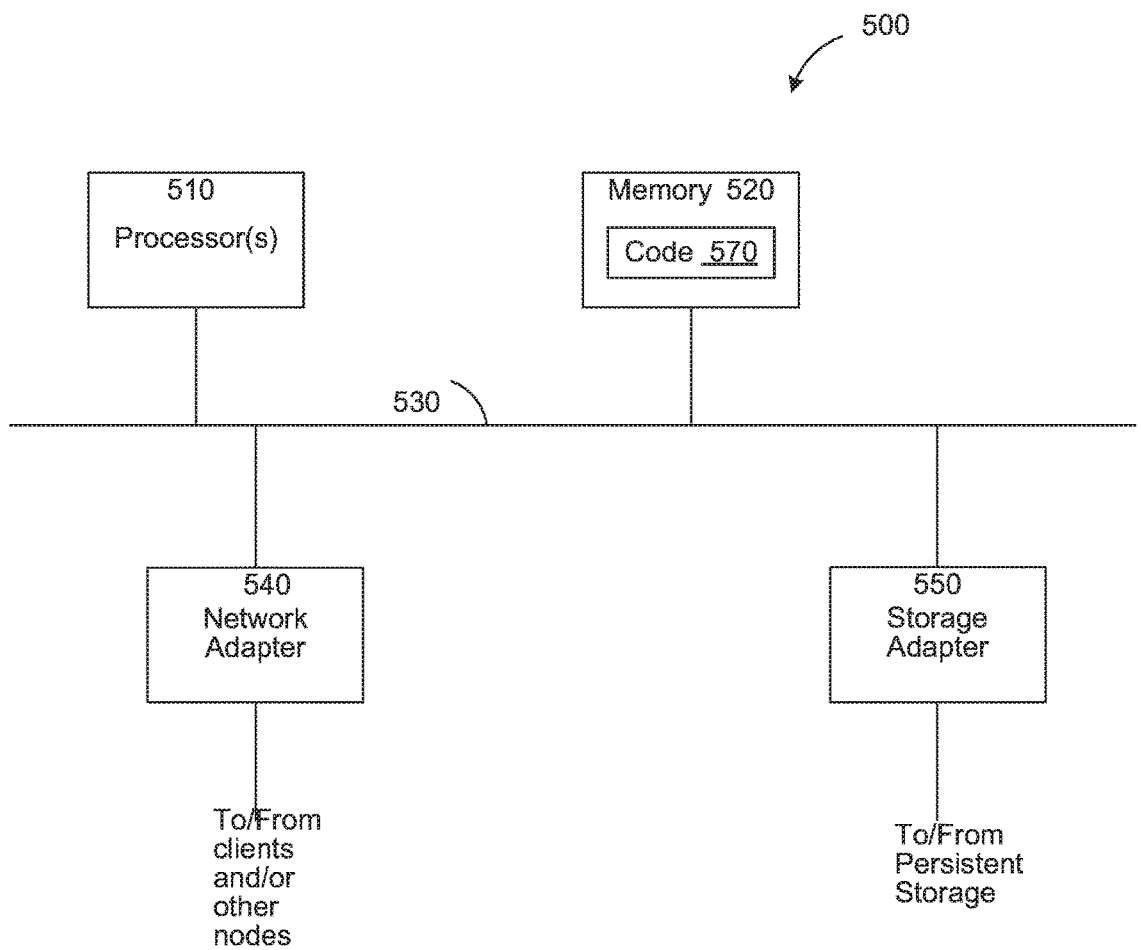
FIG. 5 is a block diagram of an example of a computing device, which may represent one or more computing devices or servers described herein, in accordance with various embodiments.

FIG. 5 is a block diagram of an example of a computing device 500, which may represent one or more communicating device or server described herein, in accordance with various embodiments. The computing device 500 can include one or more computing devices that implement the computing system 100 of FIG. 1. The computing device 500 can execute at least part of the method 300 of FIG. 3, the method 400 of FIG. 4, or a combination thereof. The computing device 500 includes one or more processors 510 and memory 520 coupled to an interconnect 530. The interconnect 530 is an abstraction that represents any one or more separate physical buses, point-to-point connections, or both connected by appropriate bridges, adapters, or controllers. The interconnect 530, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire". The interconnect 530 can also include wireless connection or communications between components.

The processor(s) 510 is/are the central processing unit (CPU) of the computing device 500 and thus controls the overall operation of the computing device 500. In certain embodiments, the processor(s) 510 accomplishes this by executing software or firmware stored in memory 520. The processor(s) 510 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 520 is or includes the main memory of the computing device 500. The memory 520 represents any form of random access memory (RAM), read-only memory (ROM), flash memory, or the like, or a combination of such devices. In use, the memory 520 may contain a code 570 containing instructions according to the operation of at least a portion of the computing system 100 or the method 300 disclosed herein.

Also connected to the processor(s) 510 through the interconnect 530 are a network adapter 540 and a storage adapter 550. The network adapter 540 provides the computing device 500 with the ability to communicate with remote devices, over a network and may be, for example, an Ethernet adapter, Fibre Channel adapter, or a wireless modem. The network adapter 540 may also provide the computing device 500 with the ability to communicate with other computers. The storage adapter 550 enables the computing device 500 to access a persistent storage, and may be, for example, a Fibre Channel adapter or SCSI adapter.

The code 570 stored in memory 520 may be implemented as software and/or firmware to program the processor(s) 510 to carry out actions described above. In certain embodiments, such software or firmware may be initially provided to the computing device 500 by downloading it from a remote system through the computing device 500 (e.g., via network adapter 540).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method, comprising:
  determining an available-housing set for representing available server racks with open locations for housing servers by identifying a number of the available server racks designated for one or more suites, one or more data centers, or a combination thereof;
  determining an opening layout for representing the open locations available to house the servers by identifying a map of the open locations in the one or more suites, the one or more data centers, or the combination thereof;
  determining a rack characterization for representing one or more constraints associated with each of the available server racks, wherein the rack characterization comprises at least a power capacity and a cooling capacity for the available server racks;

determining a resource characterization for representing one or more traits associated with each of the servers, wherein the resource characterization comprises at least an energy parameter and a thermal parameter; and generating with one or more processors designated locations for placing the servers in the open locations, wherein:

the designated locations are generated based on analyzing an evaluation set for representing multiple possible allocation combinations of the servers into the open locations, and the designated locations are generated based on analyzing allocation or placement of the servers into the open locations as an optimization function.

2. The computer-implemented method of claim 1, wherein determining the available-housing set, the opening layout, the rack characterization, and the resource characterization includes:

identifying real-world parameters;

determining the available-housing set, the opening layout, the rack characterization, and the resource characterization by translating the real-world parameters using a constraint-translation mechanism for characterizing the real-world parameters into the optimization function in generating the designated locations.

3. The computer-implemented method of claim 1, wherein generating the designated locations includes implementing a solver mechanism with the one or more processors to compare the multiple possible allocation combinations of the evaluation set according to the available-housing set, the opening layout, the rack characterization, and the resource characterization translated for the optimization function.

4. The computer-implemented method of claim 1, wherein generating the designated locations includes calculating a decision approximation using a linear optimization mechanism, wherein the decision approximation is a value within a range including and between zero and one.

5. The computer-implemented method of claim 1, wherein generating the designated locations includes solving for a binary location parameter using an integer optimization mechanism, wherein the binary location parameter is a binary value representing whether a particular instance of the servers is to be located in a particular instance of the open locations.

6. The computer-implemented method of claim 1, wherein generating the designated locations includes:

initially calculating a decision approximation using a linear optimization mechanism, wherein the decision approximation is a value within a range including and between zero and one;

calculating a binary location parameter based on the decision approximation, wherein the binary location parameter is a binary value representing whether a particular instance of the servers is to be located in a particular instance of the open locations.

7. The computer-implemented method of claim 6, wherein calculating the binary location parameter includes rounding the decision approximation according to a rounding threshold.

8. The computer-implemented method of claim 6, wherein generating the designated locations includes:

calculating the binary location parameter for a subset of the open locations in an iteration;

determining a reduced instance of the open locations based on removing the designated locations from the open locations for the iteration;

generating the designated locations for a subsequent iteration based on the reduced instance of the open locations; and iteratively generating the designated locations and reducing the open locations accordingly up to an iteration threshold.

9. The computer-implemented method of claim 6, wherein generating the designated locations includes implementing a post processing mechanism to finalize the designated locations, wherein the post processing mechanism is configured to adjust the designated locations for assigning remaining open locations, for removing one or more placements or allocations exceeding a number of available servers, or a combination thereof.

10. The computer-implemented method of claim 5, wherein solving for the binary location parameter includes directly calculating the binary location parameter without using a decision approximation initially estimating the binary location parameter.

11. The computer-implemented method of claim 1, wherein generating the designated locations includes determining optimum locations or placements of the servers based on analyzing the evaluation set for representing all possible combinations of allocations or placements of the servers into the open locations.

12. The computer-implemented method of claim 1, wherein generating the designated locations includes generating the designated locations according to a uniform distribution requirement for evenly distributing energy parameters and thermal parameters of the servers across the available server racks without exceeding a power parameter and a cooling parameter for each of the available server racks.

13. A computer-implemented method, comprising:

determining server racks with open locations for housing servers by identifying a number of available server racks designated for one or more suites, one or more data centers, or a combination thereof, wherein the server racks are located in a suite of a data center;

determining a layout for physically locating the open locations in the suite by identifying a map of the open locations in the one or more suites, the one or more data centers, or the combination thereof;

determining a power constraint and a cooling constraint associated with each of the available server racks;

determining an energy consumption parameter and a thermal characteristic parameter associated with each of the servers; and generating with one or more processors designated locations for placing the servers in the open locations, wherein:

the designated locations are generated based on analyzing an evaluation set for representing all possible allocation combinations of the servers into the open locations, and the designated locations are generated based on analyzing allocation or placement of the servers into the open locations as an optimization function for evenly distributing the energy consumption parameter and the thermal characteristic parameter of the servers across the available server racks without exceeding the power constraint and the cooling constraint for each of the available server racks.

14. The computer-implemented method of claim 13, wherein generating the designated locations includes:

initially calculating a decision approximation using a linear optimization mechanism, wherein the decision approximation is a value within a range including and between zero and one corresponding to a likelihood that a particular instance of the servers is to be located in a particular instance of the open locations;

calculating a binary location parameter based on the decision approximation, wherein the binary location parameter is a binary value representing whether the particular instance of the servers is to be located in the particular instance of the open locations.

15. The computer-implemented method of claim 14, wherein calculating the binary location parameter includes rounding the decision approximation up or down according to a rounding threshold.

16. The computer-implemented method of claim 13, wherein generating the designated locations includes directly calculating a binary location parameter without using a linear approximation initially estimating the binary location parameter, wherein the binary location parameter is a binary value representing whether a particular instance of the servers is to be located in a particular instance of the open locations for optimal placement or allocation.

17. A computer readable data storage memory storing computer-executable instructions that, when executed by a computing system, cause the computing system to perform a computer-implemented method, the instructions comprising:

instructions for identifying server racks with open locations for housing servers by identifying a number of available server racks designated for one or more suites, one or more data centers, or a combination thereof, wherein the server racks are located in a suite of a data center;

instructions for determining a layout for physically locating the open locations in the suite by identifying a map of the open locations in the one or more suites, the one or more data centers, or the combination thereof;

instructions for determining a power constraint and a cooling constraint associated with each of the available server racks;

instructions for determining an energy consumption parameter and a thermal characteristic parameter associated with each of the servers; and instructions for designated locations for placing the servers in the open locations, wherein:

the designated locations are generated based on analyzing an evaluation set for representing all possible allocation combinations of the servers into the open locations, and the designated locations are generated based on analyzing allocation or placement of the servers into the open locations as an optimization function for evenly distributing the energy consumption parameter and the thermal characteristic parameter of the servers across the available server racks without exceeding the power constraint and the cooling constraint for each of the available server racks.

18. The computer readable data storage memory of claim 17, wherein the instructions for generating the designated locations includes:

instructions for initially calculating a decision approximation using a linear optimization mechanism, wherein the decision approximation is a value within a range including and between zero and one corresponding to a likelihood that a particular instance of the servers is to be located in a particular instance of the open locations;

instructions for calculating a binary location parameter based on the decision approximation, wherein the binary location parameter is a binary value representing whether the particular instance of the servers is to be located in the particular instance of the open locations for optimal placement or allocation.

19. The computer readable data storage memory of claim 18, wherein the instructions for generating the designated locations includes:

calculating the binary location parameter for a subset of the open locations in an iteration;

determining a reduced instance of the open locations based on removing the open locations with the binary location parameter for the iteration;

calculating the binary location parameter for the reduced instance of the open locations in a subsequent iteration; and iteratively calculating the binary location parameter and reducing the open locations accordingly up to an iteration threshold.

20. The computer readable data storage memory of claim 17, wherein instructions for generating the designated locations includes instructions for directly calculating a binary location parameter from analyzing the evaluation set, wherein the binary location parameter is a binary value representing whether a particular instance of the servers is to be located in a particular instance of the open locations for optimal placement or allocation.

* * * * *